(12) United States Patent
Lampright

(10) Patent No.: US 12,001,916 B1
(45) Date of Patent: Jun. 4, 2024

(54) AUTOMATICALLY IDENTIFYING POSSIBLE CAUSES OF DECODING PROBLEMS IN A BARCODE-READING SYSTEM

(71) Applicant: The Code Corporation, Murray, UT (US)

(72) Inventor: Brian Lampright, Kaysville, UT (US)

(73) Assignee: THE CODE CORPORATION, Murray, UT (US)

( * ) Notice: Subject to any disclaimer, the term of this patent is extended or adjusted under 35 U.S.C. 154(b) by 0 days.

(21) Appl. No.: 18/311,828

(22) Filed: May 3, 2023

Related U.S. Application Data

(60) Provisional application No. 63/476,776, filed on Dec. 22, 2022.

(51) Int. Cl.
*G06K 7/14* (2006.01)

(52) U.S. Cl.
CPC .................................. *G06K 7/1413* (2013.01)

(58) Field of Classification Search
CPC .................................................... G06K 7/1413
USPC ...................................................... 235/462.01
See application file for complete search history.

(56) References Cited

U.S. PATENT DOCUMENTS 11,875,259 B1 * 1/2024 Li .............................. G06N 3/08
2016/0328660 A1 * 11/2016 Huang .................. G07G 1/0045

\* cited by examiner

*Primary Examiner* — Daniel A Hess
(74) *Attorney, Agent, or Firm* — Thomas M. Hardman

(57) ABSTRACT

A barcode-reading device can transmit data to a remote server when a decoding problem is detected. The data transmitted to the remote server can include captured images, barcode-reading device settings, and decoding metadata. The remote server can process the data and determine one or more potential causes of the decoding problem based at least in part on the results of processing the data. The processing performed by the remote server can involve the use of machine learning models that have been trained to identify image characteristics corresponding to decoding problems. Once a potential cause for a decoding problem has been determined, the remote server can perform at least one action to address the decoding problem. For example, the remote server can send one or more messages to notify certain individuals about the decoding problem and the potential cause that has been identified.

20 Claims, 10 Drawing Sheets

AUTOMATICALLY IDENTIFYING POSSIBLE CAUSES OF DECODING PROBLEMS IN A BARCODE-READING SYSTEM

CROSS-REFERENCE TO RELATED APPLICATIONS

This non-provisional patent application claims priority to and incorporates by reference the entire disclosure of U.S. Provisional Patent Application 63/476,776, filed on Dec. 22, 2022, and titled "Automatically Identifying Possible Causes of Decoding Problems in a Barcode-Reading System." The present application is related to the subject matter disclosed in the provisional application, and the provisional application is hereby incorporated by reference in its entirety into the present application.

BACKGROUND & SUMMARY

The present disclosure is generally related to barcodes and barcode-reading devices. The term "barcode" refers to an optical machine-readable representation of information. The term "barcode-reading device" refers to any device that is capable of identifying or extracting information from barcodes. The process of identifying or extracting information from a barcode can be referred to as reading (or scanning) a barcode. When a barcode is successfully read (or scanned) by a barcode-reading device, the information that is identified or extracted from the barcode can be referred to as decoded data.

An imaging-based barcode-reading device includes a camera for capturing one or more images of a barcode to be read. The camera includes a focusing lens that focuses light reflected from a target area onto a photosensor array. Once image(s) of a barcode have been captured by the camera, a decoder processes the image(s) and extracts the information contained in the barcode.

An imaging-based barcode-reading device can be a dedicated hardware device that is specifically designed for barcode reading. This type of device may be referred to as a dedicated barcode reader (or scanner). Alternatively, an imaging-based barcode-reading device can be a general-purpose computing device that includes a camera and that is equipped with software for reading barcodes. For example, mobile computing devices (e.g., smartphones, tablet computers) are frequently utilized for reading barcodes.

As used herein, the term "barcode-reading device" includes, but is not limited to, an imaging-based barcode-reading device.

As used herein, the term "imaging-based barcode-reading device" includes, but is not limited to, a dedicated barcode reader (or scanner). The term "imaging-based barcode-reading device" also includes, but is not limited to, a general-purpose computing device (e.g., a mobile computing device) that includes a camera and that is equipped with software for reading barcodes.

From time to time, problems can occur that adversely affect the performance of barcode-reading devices with respect to decoding barcodes. Many different types of problems can occur. For example, a barcode-reading device can have a defect, such as a damaged lens. As another example, the ink level within a printing device can become low enough so that any barcodes printed by the printing device have low contrast between dark and light portions. As another example, the environment in which the barcode-reading devices are located can have one or more characteristics that are less than optimal for reading barcodes (e.g., poor lighting). Those skilled in the art will recognize many additional problems that can occur.

One aspect of the present disclosure is generally related to identifying possible causes of decoding problems that occur in a barcode-reading system. Advantageously, the techniques disclosed herein enable possible causes of decoding problems to be detected automatically based at least in part on the processing of data that the barcode-reading devices transmit to a remote server.

In accordance with the present disclosure, a barcode-reading device can transmit data to a remote server when a decoding problem is detected. The data transmitted to the remote server can include captured images. Other types of data can also be transmitted, such as barcode-reading device settings and decoding metadata.

In some embodiments, a barcode-reading device can transmit a certain amount of data to a remote server under normal circumstances (before a decoding problem is detected), and the barcode-reading device can increase the amount of data that it transmits to the remote server in response to detecting a decoding problem. For example, a barcode-reading device may be configured so that it does not transmit any captured images to the remote server under normal circumstances. However, the barcode-reading device may begin to transmit captured images to the remote server when a decoding problem is detected. The barcode-reading device can also transmit additional barcode-reading device settings and/or additional decoding metadata to the remote server when a decoding problem is detected. The barcode-reading device can decrease the amount of data that the barcode-reading device transmits to the remote server when the decoding problem has been resolved or when a predefined process for responding to the decoding problem has been completed.

When a barcode-reading device detects a decoding problem and transmits data to the remote server, the remote server can process the data and determine one or more potential causes of the decoding problem based at least in part on the results of processing the data. The processing performed by the remote server can involve the use of machine learning models that have been trained to identify image characteristics corresponding to decoding problems. Data received from barcode-reading devices can be provided to one or more machine learning models for processing. A possible cause for a decoding problem can be determined based at least in part on processing results provided by one or more machine learning models.

Once a potential cause for a decoding problem has been determined, the remote server can perform at least one action to address the decoding problem. For example, the remote server can send one or more messages to notify certain individuals about the decoding problem and the potential cause that has been identified.

The subject matter in the background and summary section is intended to provide an overview of the overall context for the subject matter disclosed herein. Additional features and advantages will be set forth in the description that follows. Nothing that is described in the background and summary section should be assumed to be prior art merely as a result of its mention in the background and summary section. Similarly, a problem mentioned in the background and summary section should not be assumed to have been previously recognized in the prior art.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
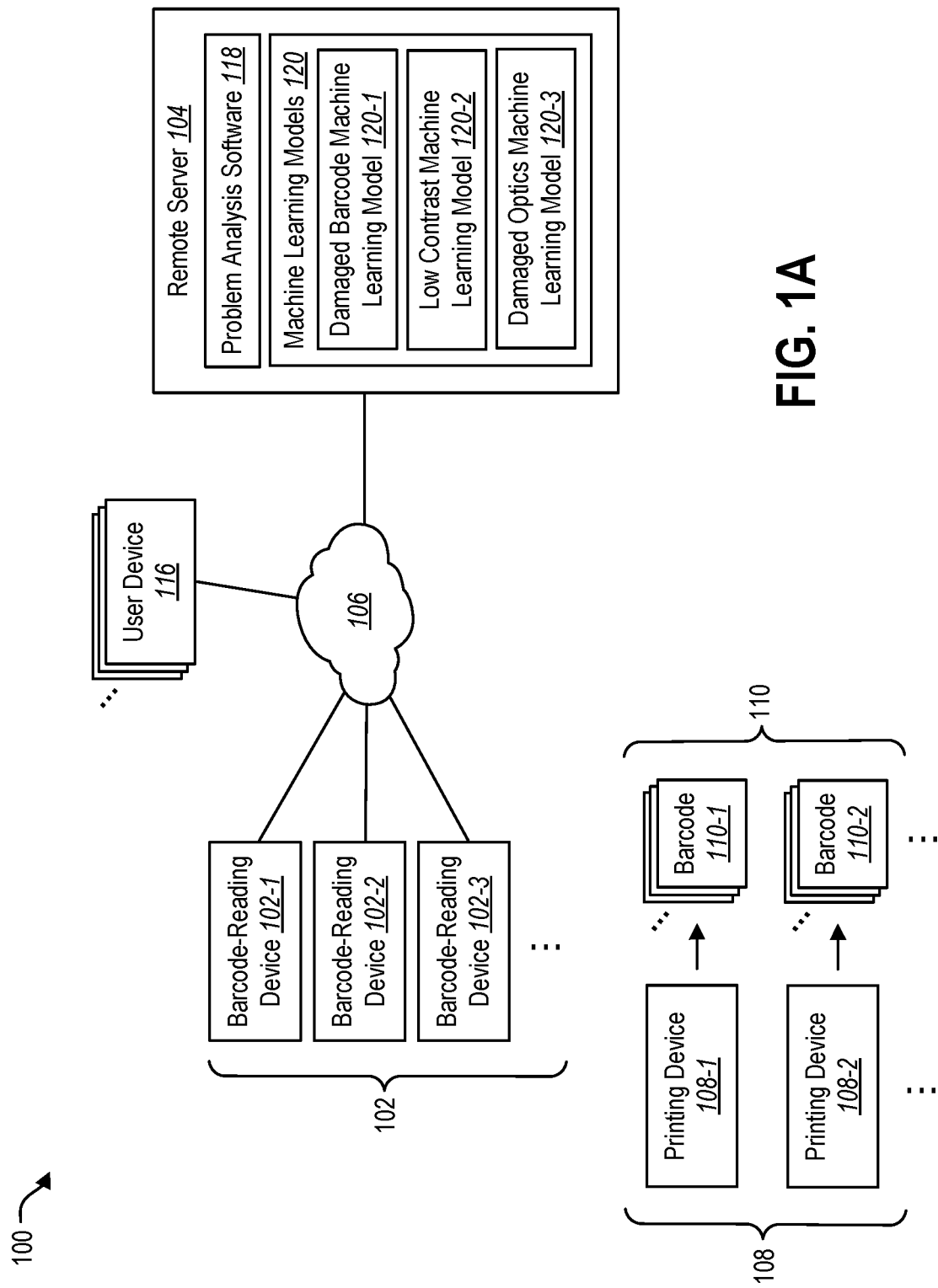
FIG. 1A illustrates an example of a barcode-reading system in which the techniques disclosed herein can be utilized.

FIG. 1A illustrates an example of a barcode-reading system 100 in which the techniques disclosed herein can be utilized. The barcode-reading system 100 includes a plurality of barcode-reading devices 102. The plurality of barcode-reading devices 102 includes a first barcode-reading device 102-1, a second barcode-reading device 102-2, and a third barcode-reading device 102-3. The plurality of barcode-reading devices 102 can be imaging-based barcode reading devices.

The barcode-reading system 100 also includes a remote server 104 that is communicatively coupled to the barcode-reading devices 102. Communication between the barcode-reading devices 102 and the remote server 104 can occur via one or more computer networks 106. In some embodiments, the remote server 104 can be located in the "cloud." More specifically, the remote server 104 can be part of a cloud computing infrastructure that is maintained and operated by a cloud computing provider for the purpose of providing cloud computing services. Examples of such cloud computing services include Amazon Web Services and Microsoft Azure.

In embodiments where the remote server 104 is part of a cloud computing infrastructure, the remote server 104 can be part of a private cloud or a public cloud. A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet.

The barcode-reading system 100 also includes a plurality of printing devices 108. The plurality of printing devices 108 includes a first printing device 108-1 and a second printing device 108-2. The printing devices 108 can be used to print barcodes 110. FIG. 1A shows a first plurality of barcodes 110-1 printed by the first printing device 108-1 and a second plurality of barcodes 110-2 printed by the second printing device 108-2. The barcodes 110 can be scanned by the barcode-reading devices 102.

From time to time, problems can occur that adversely affect the performance of the barcode-reading devices 102 with respect to decoding barcodes 110. Some examples of problems that can occur were described previously. As noted above, one aspect of the present disclosure is generally related to identifying possible causes of decoding problems that occur in a barcode-reading system 100. Advantageously, the techniques disclosed herein enable possible causes of decoding problems to be detected automatically based at least in part on the processing of data that the barcode-reading devices 102 transmit to the remote server 104.

The barcode-reading devices 102 can be configured to transmit certain data to the remote server 104 when a decoding problem is detected. The remote server 104 can be configured to process the data that is received from the barcode-reading devices 102 and to determine one or more potential causes of the decoding problem based at least in part on the results of processing this data.

Once a potential cause for a decoding problem has been determined, the remote server 104 can perform at least one action to address the decoding problem. For example, the remote server 104 can send one or more messages to notify certain individuals (e.g., managers of the barcode-reading system 100) about the decoding problem and the potential cause that has been identified. The remote server 104 can send such messages to one or more user devices 116.

At least some of the functions performed by the remote server 104 can be carried out via software that runs on the remote server 104. Such software is represented in FIG. 1A as problem analysis software 118.

The problem analysis software 118 can interact with a plurality of machine learning models 120 that have been trained to identify image characteristics corresponding to decoding problems. Many different types of machine learning models 120 can be used in accordance with the techniques disclosed herein. Under some circumstances, data received from the barcode-reading devices 102 can be provided to one or more of the machine learning models 120 for processing. A possible cause for a decoding problem can be determined based at least in part on processing results provided by one or more machine learning models 120.

Some specific examples of machine learning models 120 are shown in FIG. 1A, including a damaged barcode machine learning model 120-1, a low contrast machine learning model 120-2, and a damaged optics machine learning model 120-3. The damaged barcode machine learning model 120-1 has been trained to determine whether an image includes an image of a damaged barcode 110. The low contrast machine learning model 120-2 has been trained to determine whether an image includes a barcode 110 that has low contrast. The damaged optics machine learning model 120-3 has been trained to determine whether an image includes a characteristic that is indicative of a damaged optical component (e.g., a cracked optical lens). Some specific examples showing how these machine learning models 120-1, 120-2, 120-3 can be used to identify potential causes for decoding problems will be described below.

Of course, the specific machine learning models 120-1, 120-2, 120-3 shown in FIG. 1A are provided for purposes of example only and should not be interpreted as limiting the scope of the present disclosure. Those skilled in the art will recognize that other kinds of machine learning models 120 can be used in connection with the techniques disclosed herein.

Figure 1B:
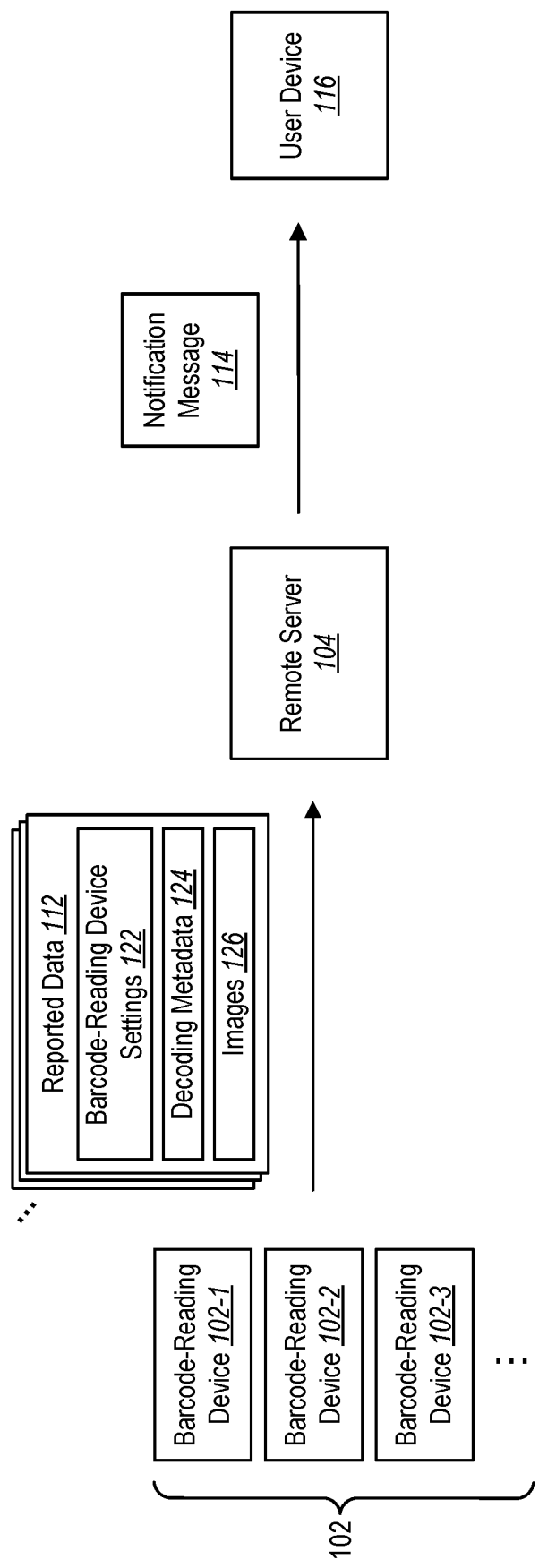
FIG. 1B illustrates examples of the types of data that barcode-reading devices can send to a remote server when a decoding problem is detected.

FIG. 1B illustrates some examples of the types of data that the barcode-reading devices 102 can send to the remote server 104 when a decoding problem is detected. This data may be referred to herein as reported data 112. The reported data 112 can include barcode-reading device settings 122, decoding metadata 124, and captured images 126.

As indicated above, the remote server 104 can be configured to process the reported data 112 received from the barcode-reading devices 102 and to determine one or more potential causes of the decoding problem based at least in part on the results of processing this reported data 112. FIG. 1B also illustrates an example of an action that can be taken by a remote server 104 when a potential cause for a decoding problem has been determined. In particular, FIG. 1B illustrates the remote server 104 sending a notification message 114 to a user device 116.

Figure 1C:
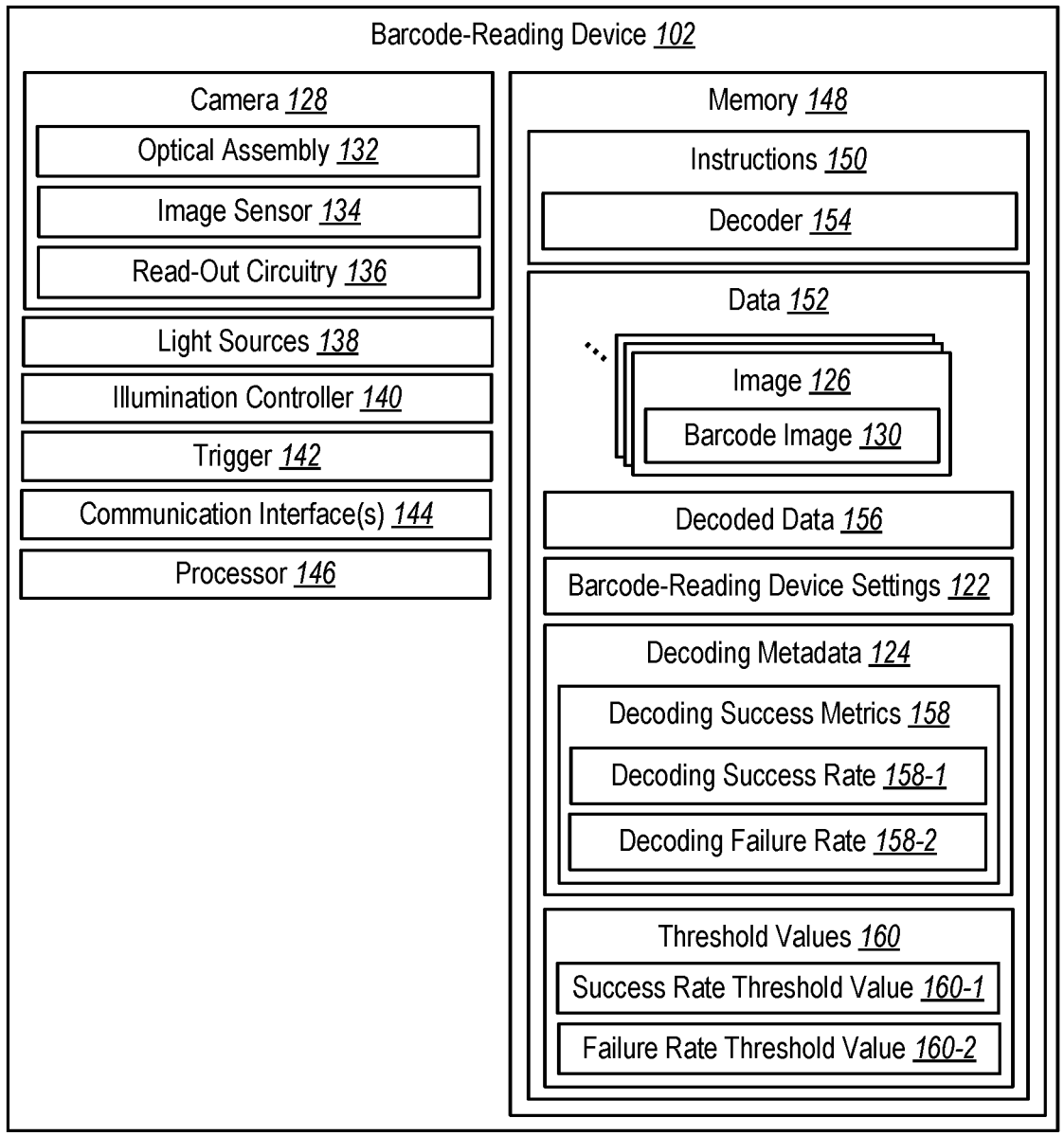
FIG. 1C illustrates various components that can be included in a barcode-reading device.

FIG. 1C illustrates various components that can be included in a barcode-reading device 102. The barcode-reading device 102 shown in FIG. 1C can be representative of all of the barcode-reading devices 102 in the barcode-reading system 100 shown in FIG. 1A. In other words, some or all of the barcode-reading devices 102 in the barcode-reading system 100 shown in FIG. 1A can include the components depicted in the barcode-reading device 102 shown in FIG. 1C.

As noted above, the barcode-reading device 102 can be an imaging-based barcode-reading device. Thus, the barcode-reading device 102 can include a camera 128 that is configured to capture images 126. The camera 128 can be a digital camera, and the images 126 captured by the camera 128 can be digital images.

The camera 128 can include an optical assembly 132 including one or more lenses. The camera 128 can also include an image sensor 134. The image sensor 134 may alternatively be referred to as an imager, a photosensor array, etc. The image sensor 134 can be a solid-state device that is configured to detect and convey information used to make an image 126. The image sensor 134 can include a relatively large number of light-sensitive pixels that are arranged in horizontal rows and vertical columns. The image sensor 134 can be a charge-coupled display (CCD) image sensor, a complementary metal-oxide-semiconductor (CMOS) image sensor, or another type of image sensor.

The lens(es) within the optical assembly 132 can be configured to receive light reflected from objects within the field of view of the camera 128 and focus this reflected light onto the image sensor 134. The camera 128 can also include read-out circuitry 136 that is configured to electronically read the pixels within the image sensor 134 to provide an image 126 (i.e., a two-dimensional array of image data).

The barcode-reading device 102 can include a plurality of light sources 138 that can be activated to illuminate a barcode 110. The barcode-reading device 102 also includes an illumination controller 140 that controls the activation and deactivation of the light sources 138.

The barcode-reading device 102 may also include a trigger 142. The trigger 142 can be a device or mechanism that is capable of being activated by a user of the barcode-reading device 102 to initiate barcode reading. The barcode-reading device 102 can include circuitry that is configured to detect the activation of the trigger 142. This circuitry can also be configured to cause the camera 128 to begin capturing images 126 in response to detecting the activation of the trigger 142.

There are many different kinds of devices or mechanisms that can be used as the trigger 142. As one example, the trigger 142 can be a device that is capable of being pressed or moved in some fashion (e.g., a lever, a button), and the trigger 142 can be activated by pressing or moving the trigger 142.

Although the barcode-reading device 102 is shown with a trigger 142 in FIG. 1C, the barcode-reading device 102 can be capable of operating in a mode in which the barcode-reading device 102 captures images 126 even when the trigger 142 is not activated. Such a mode may be referred to as a "continuous capture" or a "continuous reading" mode. In some alternative embodiments, a barcode-reading device 102 that implements the techniques disclosed herein may not include a trigger 142.

The barcode-reading device 102 can include one or more communication interfaces 144. The communication interface(s) 144 can facilitate communication between the barcode-reading device 102 and other devices, such as the remote server 104.

The barcode-reading device 102 includes a processor 146 and memory 148 that is communicatively coupled to the processor 146. Instructions 150 and data 152 can be stored in the memory 148. The instructions 150 can be executable by the processor 146 to implement some or all of the methods, steps, operations, actions, or other functionality that is described herein in connection with the barcode-reading device 102. Executing the instructions 150 can involve the use of the data 152 that is stored in the memory 148.

The data 152 stored in the memory 148 can include images 126 captured by the camera 128. At least some of the captured images 126 can include images 130 of barcodes 110.

The instructions 150 stored in the memory 148 can include a decoder 154. The decoder 154 can be executable by the processor 146 to decode the barcode images 130 captured by the camera 128. Decoding the barcode images 130 can generate decoded data 156.

The data 152 stored in the memory 148 can include barcode-reading device settings 122. The barcode-reading device settings 122 can include various settings that affect the operation of the barcode-reading device 102. In some embodiments, the barcode-reading device settings 122 can include various settings that affect the operation of the camera 128. For example, camera settings can include information about the zoom level that is being used, the camera application programming interfaces (APIs) that have been called, and so forth.

The data 152 stored in the memory 148 can also include decoding metadata 124. The decoding metadata 124 can describe one or more characteristics of the decoded data 156. However, the decoding metadata 124 is distinct from the decoded data 156. In other words, the decoded data 156 is not part of the decoding metadata 124. Some examples of decoding metadata 124 include symbology information, position information, print quality, module size, contrast information, and the like.

The data 152 stored in the memory 148 can also include one or more decoding success metrics 158. The decoding success metrics 158 can be considered to be part of the decoding metadata 124. The decoding success metric(s) 158 can indicate how successful the barcode-reading device 102 is at decoding barcodes 110 during a particular period of time. In some embodiments, the decoding success metric(s) 158 can include a decoding success rate 158-1 that indicates what percentage of decoding attempts are successful. Alternatively, or in addition, the decoding success metric(s) 158 can include a decoding failure rate 158-2 that indicates what percentage of decoding attempts are unsuccessful.

The data 152 stored in the memory 148 can also include threshold values 160 that have been defined for various purposes. The threshold values 160 can include a success rate threshold value 160-1 and a failure rate threshold value 160-2. These threshold values 160-1, 160-2 will be described in greater detail below.

Figure 1D:
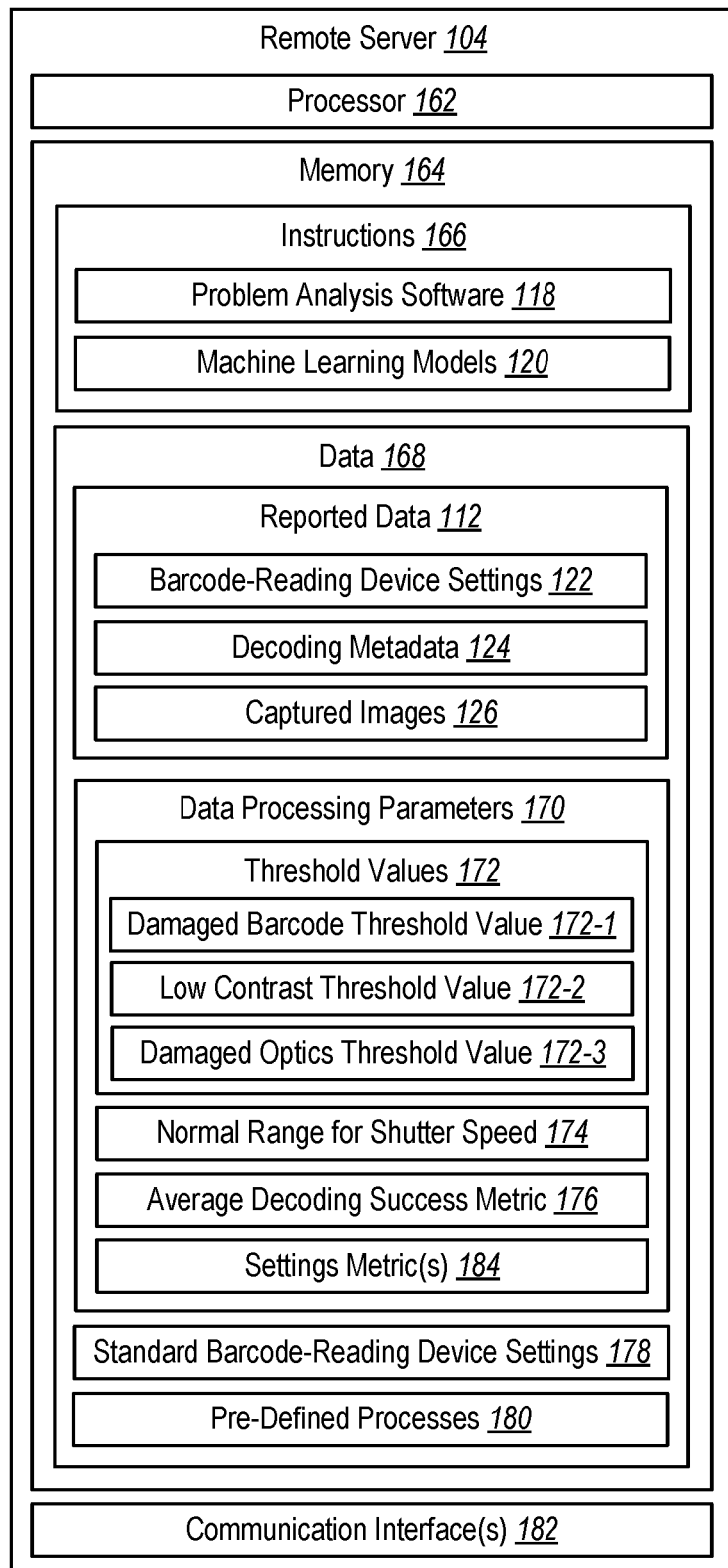
FIG. 1D illustrates various components that can be included in a remote server.

FIG. 1D illustrates various components that can be included in the remote server 104 in the barcode-reading system 100 shown in FIG. 1A.

The remote server 104 includes a processor 162 and memory 164 that is communicatively coupled to the processor 162. Instructions 166 and data 168 can be stored in the memory 164. The instructions 166 can be executable by the processor 162 to implement some or all of the methods, steps, operations, actions, or other functionality that is described herein in connection with the remote server 104. Executing the instructions 166 can involve the use of the data 168 that is stored in the memory 164.

The instructions 166 stored in the memory 164 can include the problem analysis software 118 and the machine learning models 120 discussed above.

The data 168 stored in the memory 164 can include the reported data 112 received from barcode-reading devices 102. As discussed above, the reported data 112 can include barcode-reading device settings 122, decoding metadata 124, and captured images 126.

The data 168 stored in the memory 164 can also include various parameters that can be utilized in connection with the processing of the reported data 112 received from barcode-reading devices 102. These parameters may be referred to in general terms as data processing parameters 170.

The data processing parameters 170 can include threshold values 172 that have been defined for various purposes. The threshold values 172 can include a damaged barcode threshold value 172-1, a low contrast threshold value 172-2, and a damaged optics threshold value 172-3. These threshold values 172-1, 172-2, 172-3 will be described in greater detail below.

The data processing parameters 170 can also include a definition of the normal range 174 for the shutter speed of the cameras 128 in the barcode-reading devices 102.

The data processing parameters 170 can also include an average decoding success metric 176. The average decoding success metric 176 can be calculated based at least in part on decoding success metrics 158 received from the barcode-reading devices 102, as will be described in greater detail below.

The data processing parameters 170 can also include one or more settings metrics 184. The settings metric(s) 184 can facilitate a comparison of the barcode-reading device settings 122 reported by a particular barcode-reading device 102 with a set of standard barcode-reading device settings 178, as will be described in greater detail below.

The data 168 stored in the memory 164 can also include the standard barcode-reading device settings 178 as well as pre-defined processes 180 for responding to particular decoding problems. Additional details will be provided below about how the data processing parameters 170, standard barcode-reading device settings 178, and pre-defined processes 180 can be utilized in connection with the processing of the reported data 112 received from the barcode-reading devices 102.

The remote server 104 can include one or more communication interfaces 182. The communication interface(s) 182 can facilitate communication between the remote server 104 and other devices, such as the barcode-reading devices 102 and user devices 116.

Figure 2:
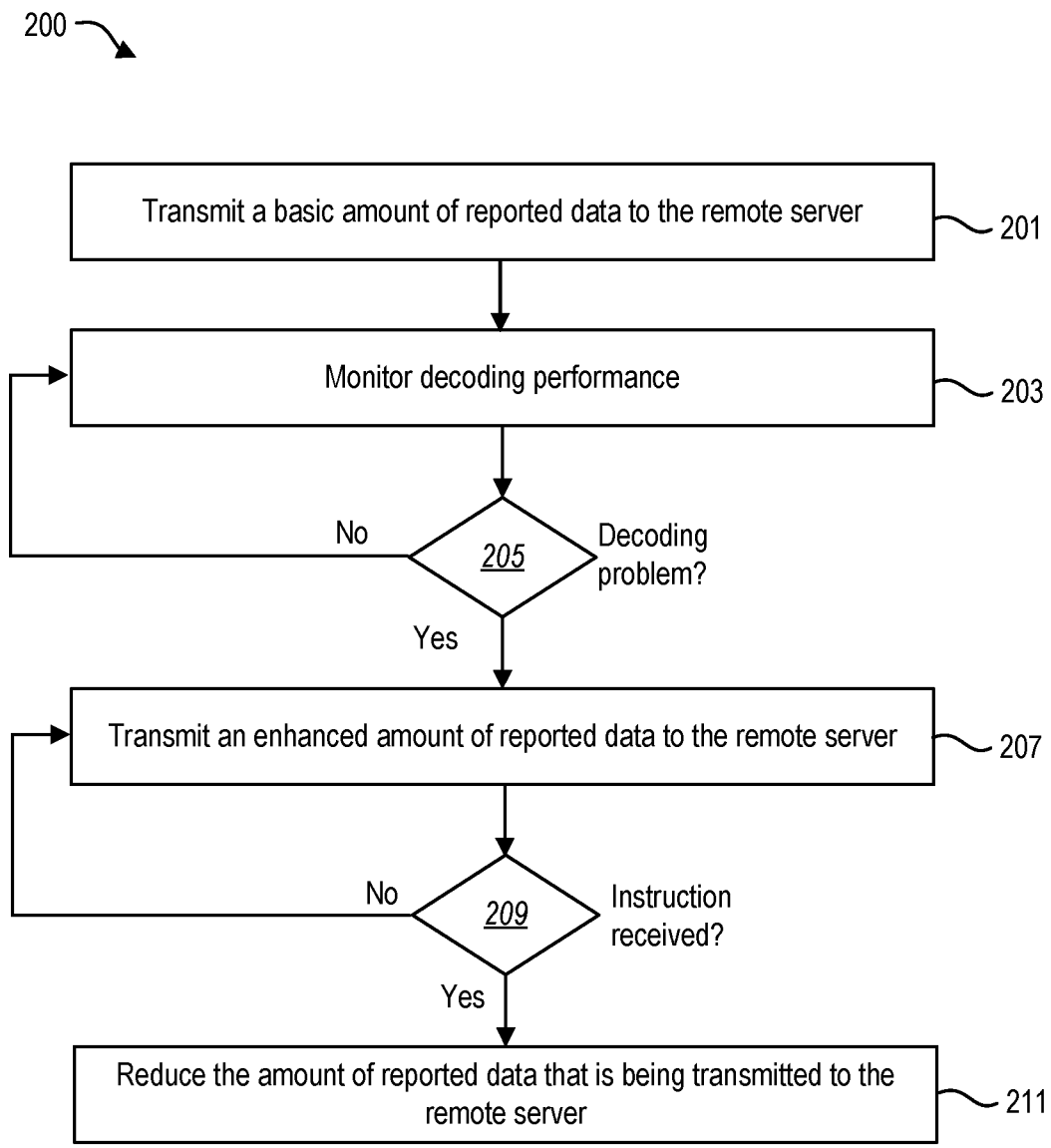
FIG. 2 illustrates one way that a barcode-reading device can transmit data to a remote server in accordance with the present disclosure.

FIG. 2 illustrates an example of a method 200 that depicts certain aspects of the operation of a barcode-reading device 102 in the system 100 shown in FIG. 1A. In particular, FIG. 2 illustrates one possible way that a barcode-reading device 102 can be configured to transmit reported data 112 to a remote server 104 in accordance with the present disclosure.

At 201, the barcode-reading device 102 transmits a basic amount of reported data 112 to the remote server 104. In this context, the basic amount of reported data 112 is how much reported data 112 the barcode-reading device 102 transmits to the remote server 104 under normal circumstances, when a decoding problem has not been detected. In some embodiments, the basic amount of reported data 112 includes barcode-reading device settings 122 and decoding metadata 124 but does not include captured images 126.

In an alternative embodiment, the barcode-reading device 102 could be configured to operate without transmitting any reported data 112 to the remote server 104 as long as a decoding problem has not been detected. An example of such an embodiment will be described below.

At 203, the barcode-reading device 102 monitors its decoding performance. At 205, the barcode-reading device 102 determines, based at least in part on the results of monitoring its decoding performance, whether a decoding problem exists. As long as a decoding problem does not exist, the barcode-reading device 102 continues to transmit the basic amount of reported data 112 to the remote server 104 and to monitor its decoding performance.

In some embodiments, monitoring the decoding performance can include monitoring one or more decoding success metrics 158, and the determination about whether a decoding problem exists can be based at least in part on the decoding success metric(s) 158. In some embodiments, monitoring the decoding performance can include monitoring the decoding success rate 158-1. If the decoding success rate 158-1 falls below the success rate threshold value 160-1, then this can be interpreted as an indication that a decoding problem exists. Alternatively, or in addition, monitoring the decoding performance can include monitoring the decoding failure rate 158-2. If the decoding failure rate 158-2 rises above the failure rate threshold value 160-2, then this can be interpreted as an indication that a decoding problem exists.

When the barcode-reading device 102 determines that a decoding problem exists, then at 207 the barcode-reading device 102 can begin to transmit an enhanced amount of reported data 112 to the remote server 104. The enhanced amount of reported data 112 includes more data than the basic amount of reported data 112. In some embodiments, the basic amount of reported data 112 does not include captured images 126 but the enhanced amount of reported data 112 does include captured images 126. The enhanced amount of reported data 112 can also include more barcode-reading device settings 122 and/or more decoding metadata 124 than the basic amount of reported data 112.

The barcode-reading device 102 can continue to transmit the enhanced amount of reported data 112 to the remote server 104 until, at 209, the barcode-reading device 102 receives an instruction to reduce the amount of reported data 112 that is being transmitted to the remote server 104. In response to receiving this type of instruction, the barcode-reading device 102 can reduce the amount of reported data 112 that is being transmitted to the remote server 104.

In some embodiments, the remote server 104 can send the barcode-reading device 102 an instruction to reduce the amount of reported data 112 that is being transmitted to the remote server 104. Alternatively, or in addition, the barcode-reading device 102 can receive this type of instruction via user input from a user of the barcode-reading device 102.

Under some circumstances, an instruction to reduce the amount of reported data 112 that is being transmitted to the remote server 104 can be provided to the barcode-reading device 102 when the decoding problem has been resolved. Alternatively, such an instruction can be provided to the barcode-reading device 102 when a pre-defined process 180 for responding to the decoding problem has been completed, even if the decoding problem has not been fully resolved.

Thus, in the embodiment depicted in FIG. 2, the barcode-reading device 102 is configured to transmit a certain amount of reported data 112 to the remote server 104 under normal circumstances, and the barcode-reading device 102 increases the amount of reported data 112 that it transmits to the remote server 104 in response to detecting a decoding problem. The barcode-reading device 102 is also configured to decrease the amount of reported data 112 that the barcode-reading device 102 transmits to the remote server 104 when the decoding problem has been resolved or when a pre-defined process 180 for responding to the decoding problem has been completed.

Figure 3:
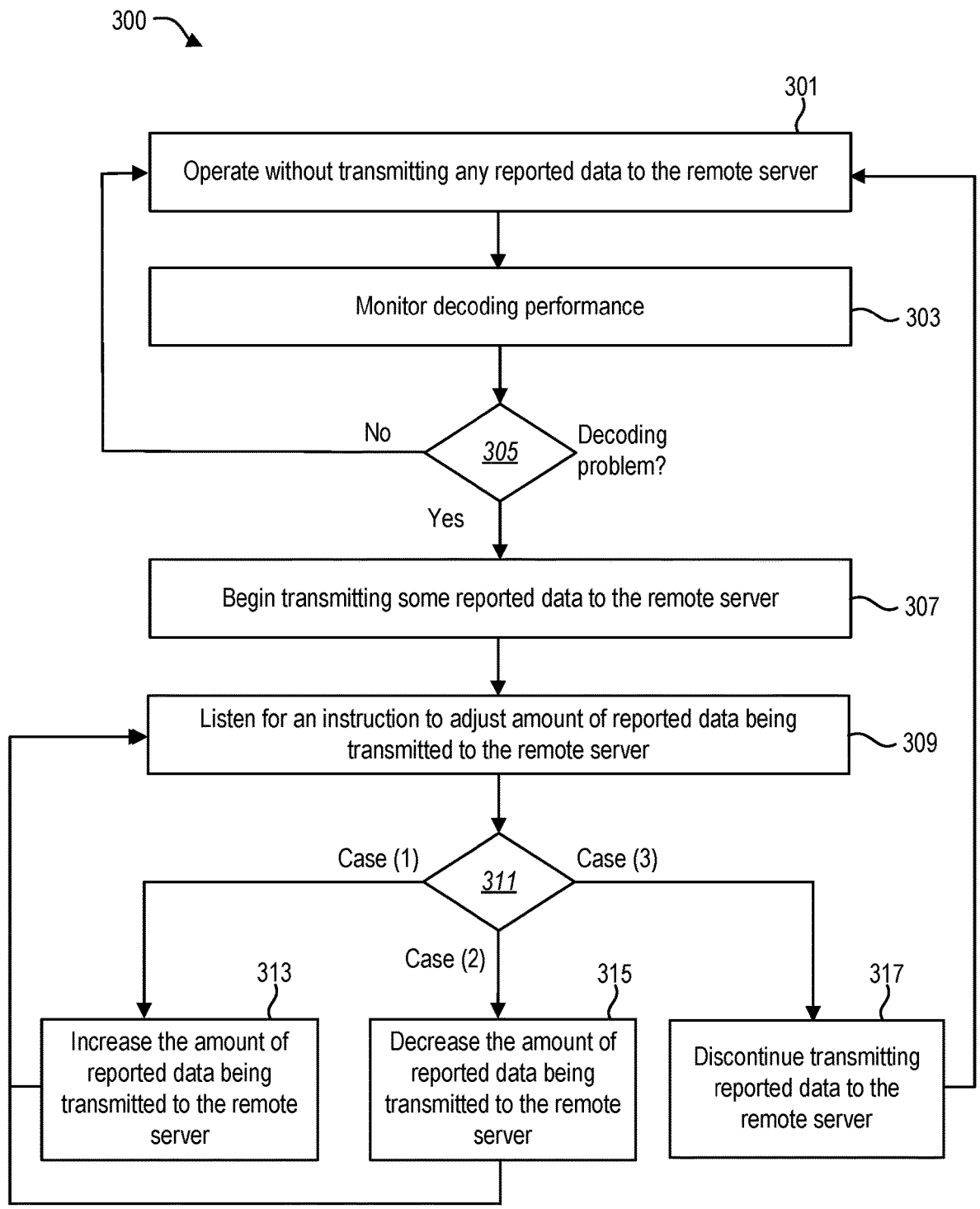
FIG. 3 illustrates another way that a barcode-reading device can transmit data to a remote server in accordance with the present disclosure.

FIG. 3 illustrates another method 300 showing another possible way that a barcode-reading device 102 can be configured to transmit reported data 112 to a remote server 104 in accordance with the present disclosure.

At 301, the barcode-reading device 102 operates in a mode where transmission of reported data 112 to the remote server 104 does not occur. In other words, the barcode-reading device 102 can be used to scan barcodes 110, but the barcode-reading device 102 does not initially transmit any reported data 112 to the remote server 104 as long as a decoding problem has not been detected.

At 303, the barcode-reading device 102 monitors its decoding performance. This monitoring can occur in a manner that is similar to act 203 in the method 200 shown in FIG. 2, as described above.

At 305, the barcode-reading device 102 determines, based at least in part on the results of monitoring its decoding performance, whether a decoding problem exists. As long as a decoding problem does not exist, the barcode-reading device 102 continues to operate without transmitting any reported data 112 to the remote server 104 and to monitor its decoding performance.

When the barcode-reading device 102 determines that a decoding problem exists, then at 307 the barcode-reading device 102 can begin to transmit some reported data 112 to the remote server 104.

At 309, the barcode-reading device 102 can listen for an instruction to adjust the amount of reported data 112 that is being transmitted to the remote server 104. In some embodiments, the remote server 104 can send the barcode-reading device 102 an instruction to adjust the amount of reported data 112 that is being transmitted to the remote server 104. Alternatively, or in addition, the barcode-reading device 102 can receive this type of instruction via user input from a user of the barcode-reading device 102.

Broadly speaking, there are three types of instructions that can be received: (1) an instruction to increase the amount of reported data 112 that is being transmitted to the remote server 104, (2) an instruction to decrease the amount of reported data 112 that is being transmitted to the remote server 104, or (3) an instruction to discontinue transmitting reported data 112 to the remote server 104.

When an instruction to adjust the amount of reported data 112 that is being transmitted to the remote server 104 is received, then at 311 a determination can be made about what type of instruction it is. In the event of (1), then at 313 the barcode-reading device 102 can increase the amount of reported data 112 that is being transmitted to the remote server 104. In the event of (2), then at 315 the barcode-reading device 102 can increase the amount of reported data 112 that is being transmitted to the remote server 104. After either 313 or 315, the method 300 can return to 309 and the barcode-reading device 102 can listen for any additional instructions that are received.

In the event of (3), then at 317 the barcode-reading device 102 can discontinue transmitting reported data 112 to the remote server 104. The method 300 can then return to 301, and the barcode-reading device 102 can operate without transmitting any reported data 112 to the remote server 104 and monitor its decoding performance. The method 300 can then proceed in the manner described above.

In the embodiments shown in FIGS. 2 and 3, the barcode-reading device 102 detects a decoding problem and begins sending reported data 112 to the remote server 104. In an alternative embodiment, the remote server 104 can detect a decoding problem and instruct one or more barcode-reading devices 102 to begin sending reported data 112 to the remote server 104. For example, one or more barcode-reading devices 102 can send decoding success metrics 158 to the remote server 104 on a regular basis (e.g., periodically). The remote server 104 can determine an average decoding success metric 176 based on the decoding success metrics 158 received from a plurality of barcode-reading devices 102. When the remote server 104 determines that a decoding success metric 158 received from a particular barcode-reading device 102 differs from the average decoding success metric 176 by more than a threshold amount, the remote server 104 can infer that the barcode-reading device 102 is experiencing some type of decoding problem. In response to making this inference, the remote server 104 can request that the barcode-reading device 102 begin sending reported data 112 to the remote server 104 (or increase the amount of reported data 112 that is being sent to the remote server 104).

Figure 4:
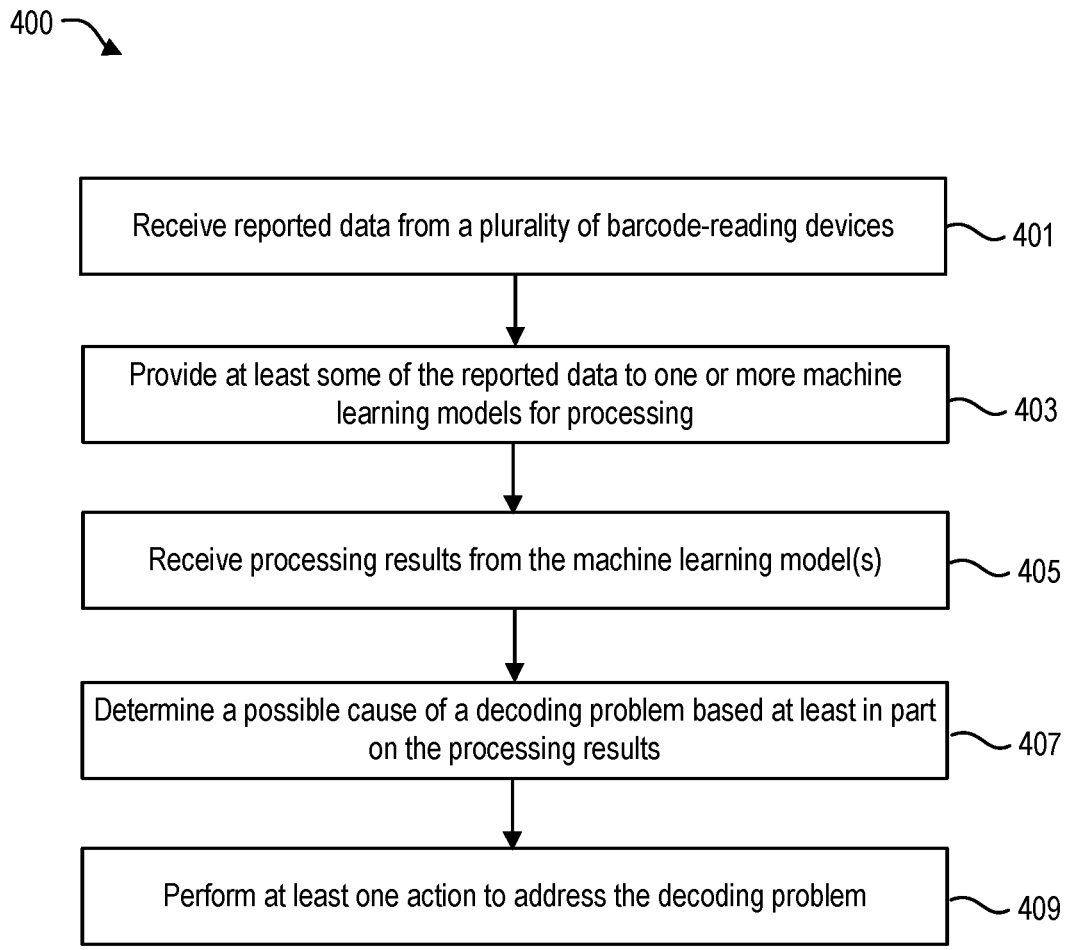
FIG. 4 illustrates certain aspects of the operation of a remote server in accordance with the present disclosure.

FIG. 4 illustrates a method 400 that depicts certain aspects of the operation of the remote server 104 in the barcode-reading system 100 shown in FIG. 1A. At 401, the remote server 104 can receive reported data 112 from a plurality of barcode-reading devices 102. At 403, the remote server 104 can provide at least some of the reported data 112 to one or more machine learning models 120 for processing. At 405, the remote server 104 can receive processing results from the machine learning model(s) 120. At 407, the remote server 104 can determine a possible cause of a decoding problem based at least in part on the processing results. At 409, the remote server 104 can perform at least one action to address the decoding problem.

The depicted method 400 illustrates certain aspects of the operation of the remote server 104 at a high level. Some specific examples showing how the various actions in the method 400 can be implemented in particular scenarios will now be described.

Figure 5:
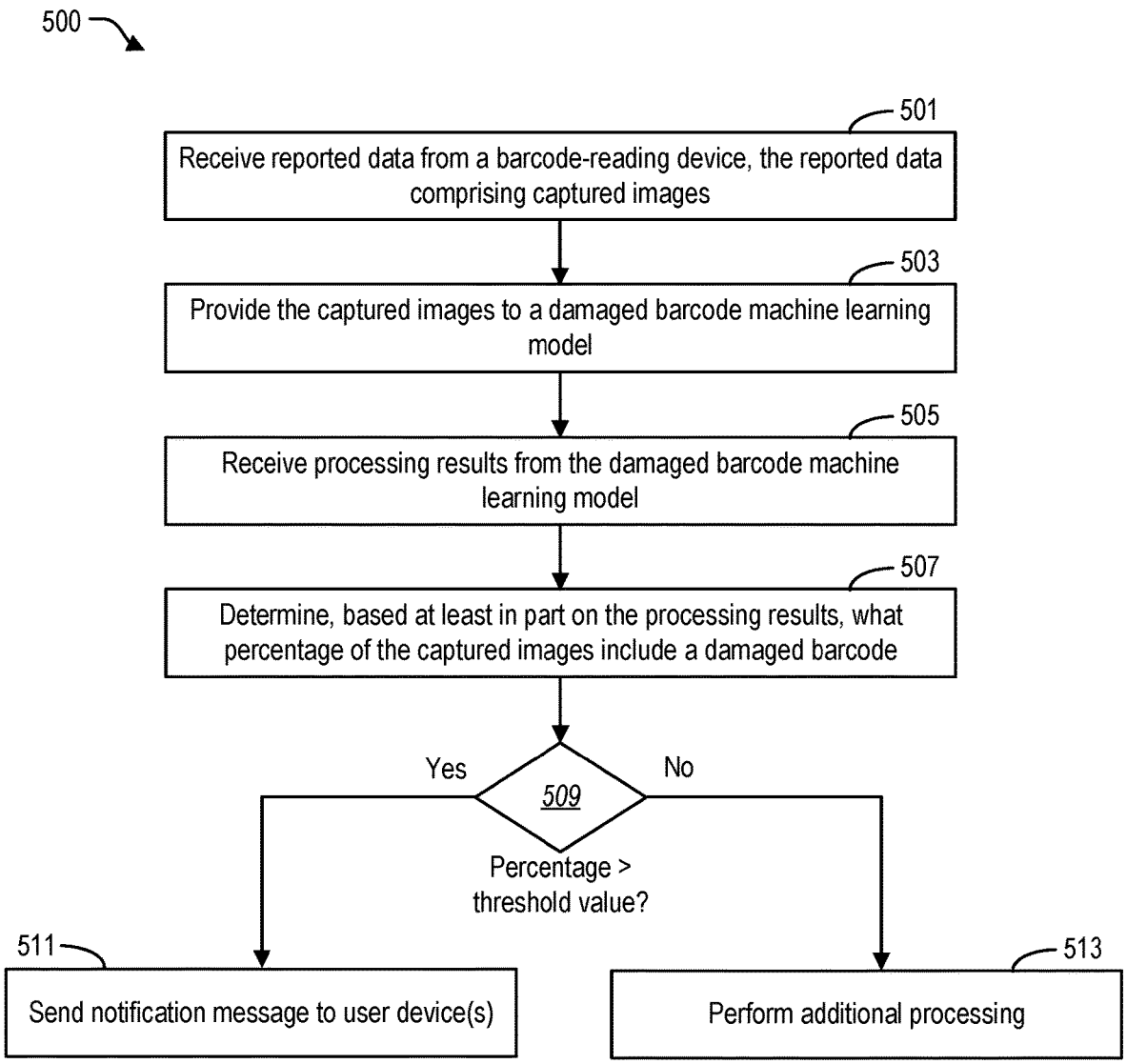
FIG. 5 illustrates one possible implementation of the method shown in FIG. 4.

FIG. 5 illustrates another method 500 that depicts certain aspects of the operation of the remote server 104 in the barcode-reading system 100 shown in FIG. 1A. The method 500 shown in FIG. 5 represents one possible implementation of the method 400 shown in FIG. 4.

At 501, the remote server 104 can receive reported data 112 from a barcode-reading device 102. The reported data 112 can include captured images 126. As discussed above, the barcode-reading device 102 can send the reported data 112 to the remote server 104 in response to detecting a decoding problem.

At 503, the remote server 104 can provide the captured images 126 received from the barcode-reading device 102 to a damaged barcode machine learning model 120-1. As indicated above, the damaged barcode machine learning model 120-1 is a machine learning model that has been trained to determine whether an image 126 includes a damaged barcode 110.

At 505, the remote server 104 can receive processing results from the damaged barcode machine learning model 120-1. At 507, the remote server 104 can determine, based at least in part on the processing results received from the damaged barcode machine learning model 120-1, what percentage of the captured images 126 include a damaged barcode 110.

At 509, the remote server 104 can compare the percentage determined in 507 with the damaged barcode threshold value 172-1. The damaged barcode threshold value 172-1 can be defined so that, if the percentage determined in 507 exceeds the damaged barcode threshold value 172-1, it is likely that there is some aspect of the barcode-reading system 100 that is causing barcodes 110 to become damaged. Thus, if the remote server 104 determines that the percentage determined in 507 exceeds the damaged barcode threshold value 172-1, then at 511 the remote server 104 can send a notification message 114 to one or more user devices 116 indicating that there is something wrong with the barcode-reading system 100. On the other hand, if the remote server 104 determines that the percentage determined in 507 does not exceed the damaged barcode threshold value 172-1, then it may be inferred that something other than damaged barcodes 110 is causing whatever decoding problem was detected by the barcode-reading device 102. In this case, at 513, the remote server 104 can perform additional processing (e.g., one or more of the other methods described herein) in an effort to determine a possible cause of the decoding problem.

Figure 6:
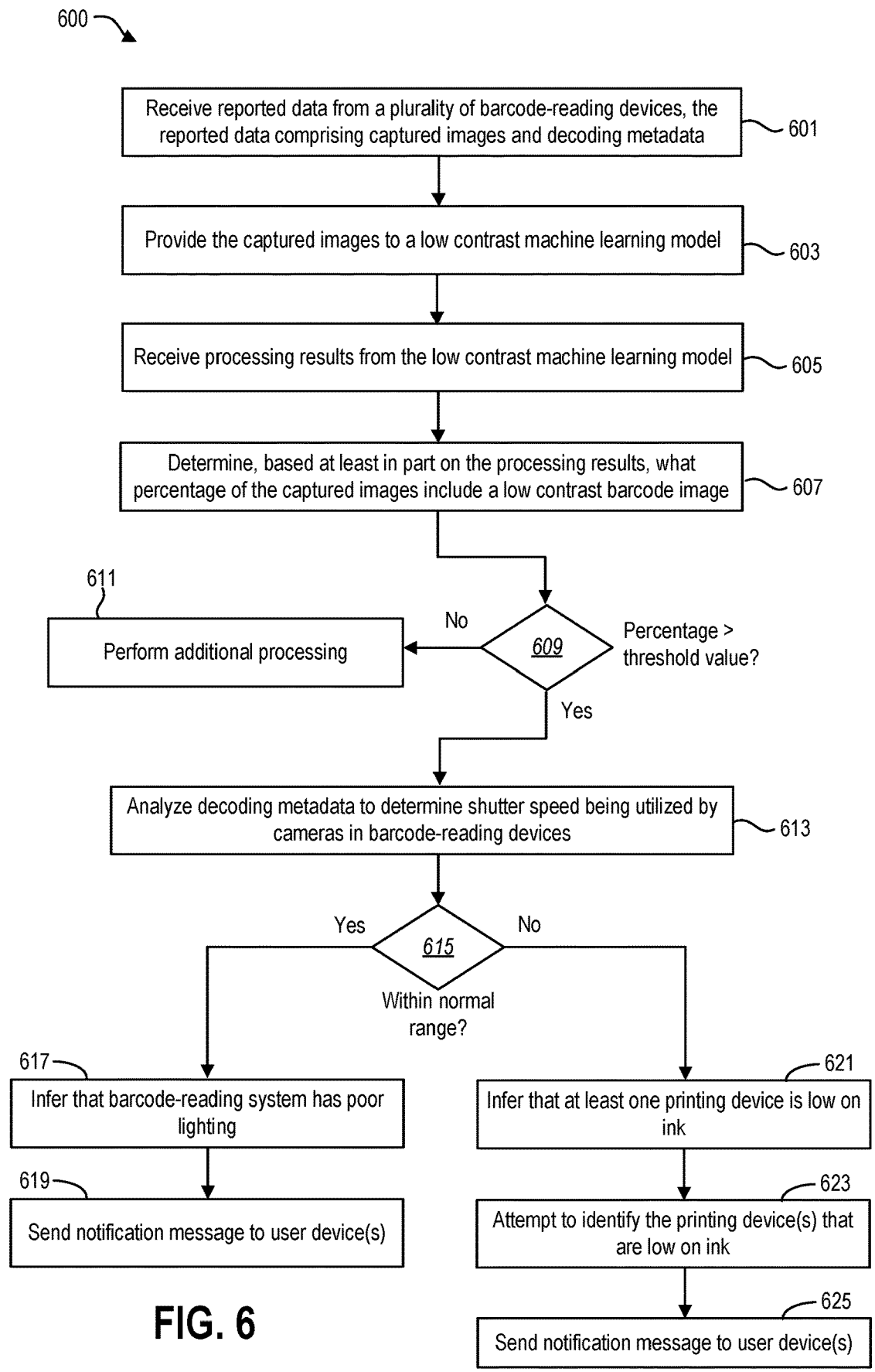
FIG. 6 illustrates another possible implementation of the method shown in FIG. 4.

FIG. 6 illustrates another method 600 that depicts certain aspects of the operation of the remote server 104 in the barcode-reading system 100 shown in FIG. 1A. The method 600 shown in FIG. 6 represents another possible implementation of the method 400 shown in FIG. 4.

At 601, the remote server 104 can receive reported data 112 from a plurality of barcode-reading devices 102. The reported data 112 can include captured images 126 and decoding metadata 124. As discussed above, the barcode-reading devices 102 can send the reported data 112 to the remote server 104 in response to detecting a decoding problem.

In some embodiments, the barcode-reading devices 102 can each operate independently with respect to the detection of decoding problems and the transmission of reported data 112 to the remote server 104. In other words, the barcode-reading devices 102 can each independently detect a decoding problem and then independently begin transmitting the reported data 112 to the remote server 104. Different barcode-reading devices 102 can have different decoding problems.

At 603, the remote server 104 can provide the captured images 126 received from the barcode-reading devices 102 to a low contrast machine learning model 120-2. As indicated above, the low contrast machine learning model 120-2 is a machine learning model that has been trained to determine whether an image 126 includes a barcode image 130 that has low contrast.

At 605, the remote server 104 can receive processing results from the low contrast machine learning model 120-2. At 607, the remote server 104 can determine, based at least in part on the processing results received from the low contrast machine learning model 120-2, what percentage of the captured images 126 include a barcode image 130 that has low contrast.

At 609, the remote server 104 can compare the percentage determined in 607 to the low contrast threshold value 172-2. The low contrast threshold value 172-2 can be defined so that, if the percentage determined in 607 exceeds the low contrast threshold value 172-2, it is likely that there is a decoding problem related to low contrast barcode images 130.

Thus, if the remote server 104 determines that the percentage determined in 607 does not exceed the low contrast threshold value 172-2, then then it may be inferred that something other than low contrast barcode images 130 is causing whatever decoding problem was detected by the barcode-reading devices 102. In this case, at 611, the remote server 104 can perform additional processing (e.g., one or more of the other methods described herein) in an effort to determine a possible cause of the decoding problem.

On the other hand, if the remote server 104 determines that the percentage determined in 607 exceeds the low contrast threshold value 172-2, then the remote server 104 can infer the existence of some problem related to low contrast barcode images 130. However, there is more than one possible cause for low contrast barcode images 130. One possible cause is that one or more printing devices 108 are low on ink. Another possible cause is that the barcode-reading system 100 has poor lighting. In the remainder of the method 600, the decoding metadata 124 can be utilized to determine which possible cause is more likely.

At 613, the remote server 104 can analyze the decoding metadata 124 to determine the shutter speed being utilized by the cameras 128 in the barcode-reading devices 102. At 615, the shutter speed determined in 613 can be compared with the normal range 174 for the shutter speed.

If the shutter speed determined in 613 is slower than the normal range 174 for the shutter speed, then this suggests that the most likely cause of the decoding problem is poor lighting. Thus, at 617 the remote server 104 can infer that the barcode-reading system 100 has poor lighting. At 619, the remote server 104 can send a notification message 114 to one or more user devices 116. The notification message 114 can indicate that a decoding problem has been detected, and that a likely cause of the decoding problem is that the barcode-reading system 100 has poor lighting.

On the other hand, if the shutter speed determined in 613 is within the normal range 174 for the shutter speed, then this suggests that the most likely cause of the decoding problem is that at least one printing device 108 is low on ink. In this case, at 621 the remote server 104 can infer that the barcode-reading system 100 includes at least one printing device 108 that is low on ink.

At 623, the remote server 104 can attempt to identify the specific printing devices 108 that are low on ink. For example, in some embodiments the barcodes 110 printed by a particular printing device 108 can include an identifier that identifies the printing device 108. In such embodiments, the remote server 104 can attempt to detect printer identifiers in the captured images 126 that include low contrast barcode images 130.

At 625, the remote server 104 can send a notification message 114 to one or more user devices 116. The notification message 114 can indicate that a decoding problem has been detected and that a likely cause of the decoding problem is that at least one printing device 108 is low on ink. In some embodiments, the notification message 114 can also identify the specific printing device(s) 108 that are low on ink. For example, the notification message 114 can include identifier(s) corresponding to the specific printing device(s) 108 that are low on ink.

Figure 7:
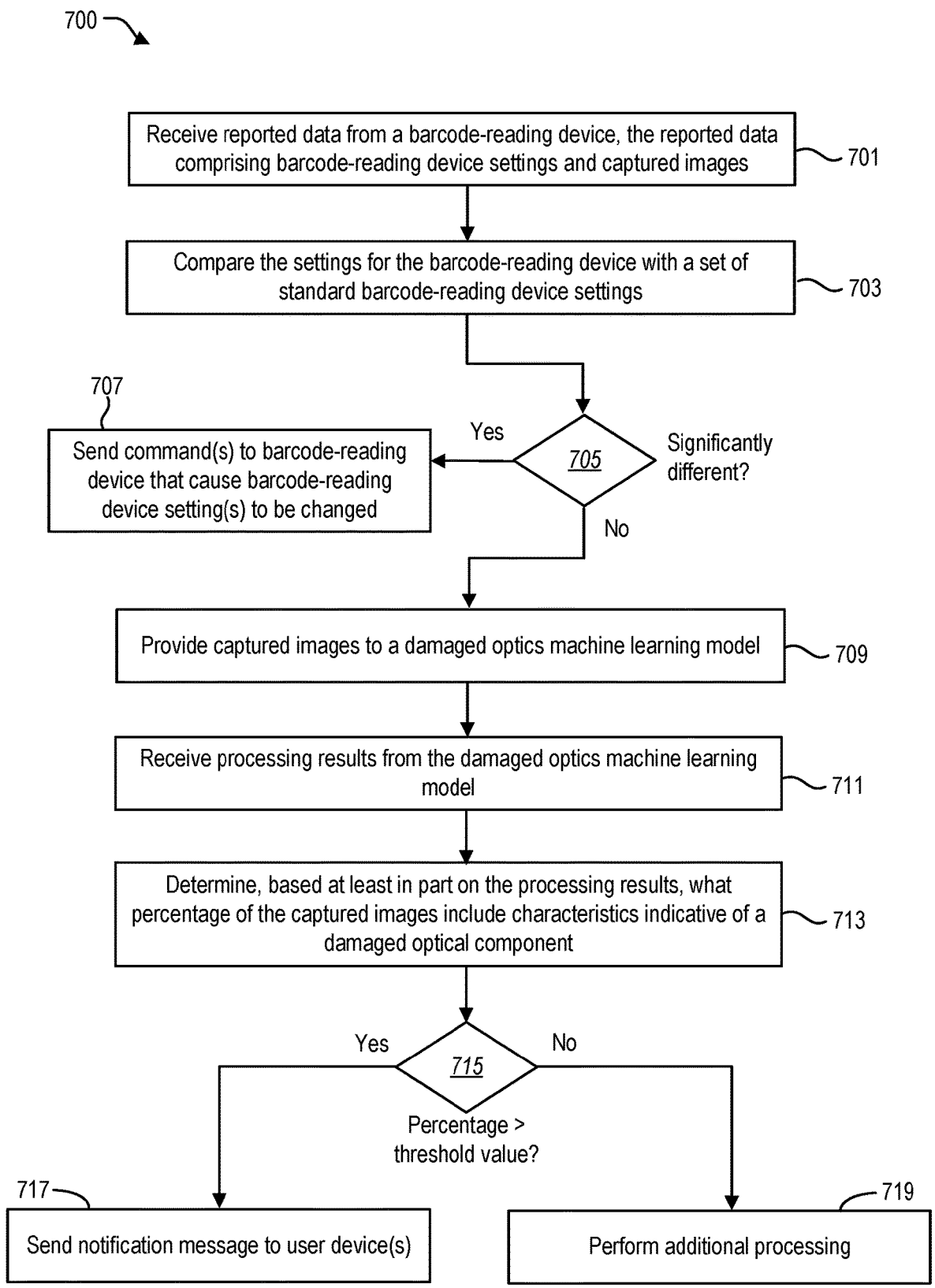
FIG. 7 illustrates another possible implementation of the method shown in FIG. 4.

FIG. 7 illustrates another method 700 that depicts certain aspects of the operation of the remote server 104 in the barcode-reading system 100 shown in FIG. 1A. The method 700 shown in FIG. 7 represents another possible implementation of the method 400 shown in FIG. 4.

At 701, the remote server 104 can receive reported data 112 from a barcode-reading device 102. The reported data 112 can include barcode-reading device settings 122 and captured images 126. As discussed above, the barcode-reading device 102 can send the reported data 112 to the remote server 104 in response to detecting a decoding problem.

At 703, the remote server 104 can compare the settings 122 for the barcode-reading device 102 with a set of standard barcode-reading device settings 178. The standard barcode-reading device settings 178 can represent a default and/or desired configuration for barcode-reading devices 102. In other words, the standard barcode-reading device settings 178 can represent how most barcode-reading devices 102 are configured. In some embodiments, the standard barcode-reading device settings 178 can be determined by administrators of the barcode-reading device system 100.

At 705, the remote server 104 can determine, based at least in part on the comparison made at 703, whether the settings 122 for the barcode-reading device 102 are significantly different than the standard barcode-reading device settings 178. In some embodiments, this can involve determining the differences between the settings 122 for the barcode-reading device 102 and the standard barcode-reading device settings 178 and then comparing these differences with a settings metric 184. For example, the remote server 104 can determine whether the number of differences between the settings 122 for the barcode-reading device 102 and the standard barcode-reading device settings 178 exceeds a pre-defined threshold value.

If at 705 it is determined that the barcode-reading device 102 is configured significantly differently than the standard barcode-reading device settings 178, then the remote server 104 can take one or more actions to address this issue. In some embodiments, the remote server 104 can cause one or more of the barcode-reading device settings 122 to be automatically changed. More specifically, the remote server 104 can communicate directly with the barcode-reading device 102 and cause one or more of the barcode-reading device settings 122 to be changed so that they are similar or identical to the standard barcode-reading device settings 178. For example, at 707 the remote server 104 can send one or commands to the barcode-reading device 102. The command(s) can cause the barcode-reading device 102 to change one or more of its settings 122 so that they match (or substantially match) the standard barcode-reading device settings 178.

Alternatively, or in addition, the remote server 104 can send a notification message 114 to one or more user devices 116. The notification message 114 can indicate that the barcode-reading device 102 is configured differently than the standard barcode-reading device settings 178. In response to receiving the notification message 114, an administrator of the barcode-reading system 100 can cause one or more of the barcode-reading device settings 122 to be changed.

If at 705 it is determined that the barcode-reading device 102 is not configured significantly differently than the standard barcode-reading device settings 178, then at 709 the remote server 104 can provide the captured images 126 received from the barcode-reading device 102 to a damaged optics machine learning model 120-3. As indicated above, the damaged optics machine learning model 120-3 is a machine learning model that has been trained to determine whether an image 126 includes a characteristic that is indicative of a damaged optical component (e.g., a cracked optical lens).

At 711, the remote server 104 can receive processing results from the damaged optics machine learning model 120-3. At 713, the remote server 104 can determine, based at least in part on the processing results received from the damaged optics machine learning model 120-3, what percentage of the captured images 126 include characteristics indicative of a damaged optical component.

At 715, the remote server 104 can compare the percentage determined in 713 to the damaged optics threshold value 172-3. The damaged optics threshold value 172-3 can be defined so that, if the percentage determined in 713 exceeds the damaged optics threshold value 172-3, it is likely that the barcode-reading device 102 includes a damaged optical component. Thus, if the remote server 104 determines that the percentage determined in 713 exceeds the damaged optics threshold value 172-3, then the remote server 104 can take one or more actions to address this issue. For example, at 717 the remote server 104 can send a notification message 114 to one or more user devices 116 indicating that the barcode-reading device 102 likely includes a damaged optical component.

On the other hand, if the remote server 104 determines that the percentage determined in 713 does not exceed the damaged barcode threshold value 172-1, then it may be inferred that something other than a damaged optical component is causing whatever decoding problem was detected by the barcode-reading device 102. In this case, at 719, the remote server 104 can perform additional processing (e.g., one or more of the other methods described herein) in an effort to determine a possible cause of the decoding problem.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The communication interface(s) described herein can be based on wireless communication technology and/or wired communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port. Some examples of communication interfaces that are based on wired communication technology include a Universal Serial Bus (USB) and an Ethernet adapter.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading system comprising:
   a plurality of barcode-reading devices that are each configured to transmit data to a remote server based at least in part on detecting a decoding problem;
   a plurality of machine learning models that have been trained to identify image characteristics corresponding to decoding problems; and
   instructions on the remote server that are executable by at least one processor to:
      provide at least some of the data received from the plurality of barcode-reading devices to one or more machine learning models for processing;
      receive processing results from the one or more machine learning models;
      determine a possible cause of the decoding problem based at least in part on the processing results; and
      perform at least one action to address the decoding problem.

2. The barcode-reading system of claim 1, wherein the data received from the plurality of barcode-reading devices comprises barcode-reading device settings, decoding metadata, and captured images.

3. The barcode-reading system of claim 1, wherein the plurality of barcode-reading devices are configured to:
   transmit a basic amount of data to the remote server before the decoding problem is detected; and
   transmit an enhanced amount of data to the remote server after the decoding problem is detected.

4. The barcode-reading system of claim 3, wherein:
   the basic amount of data does not include any captured images; and
   the enhanced amount of data includes at least some captured images.

5. The barcode-reading system of claim 3, wherein the enhanced amount of data includes more barcode-reading device settings than the basic amount of data.

6. The barcode-reading system of claim 3, wherein the enhanced amount of data includes more decoding metadata than the basic amount of data.

7. The barcode-reading system of claim 3, wherein a barcode-reading device decreases the amount of data being transmitted to the remote server in response to receiving an instruction from the remote server.

8. The barcode-reading system of claim 7, wherein the remote server is configured to send the instruction to the barcode-reading device when a process for addressing the decoding problem has been completed.

9. The barcode-reading system of claim 1, wherein:
before the decoding problem is detected the barcode-reading devices operate in a mode in which the barcode-reading devices do not transmit any data to the remote server; and
the barcode-reading devices begin transmitting the data to the remote server after the decoding problem is detected.

10. The barcode-reading system of claim 1, wherein performing the at least one action to address the decoding problem comprises sending a notification message to at least one user device, the notification message comprising an indication of the possible cause of the decoding problem.

11. The barcode-reading system of claim 1, wherein:
the plurality of barcode-reading devices are each configured to determine a decoding success metric; and
detecting the decoding problem is based at least in part on the decoding success metric.

12. The barcode-reading system of claim 11, wherein:
the decoding problem is detected by the remote server; and
detecting the decoding problem comprises determining that the decoding success metric for a barcode-reading device differs from an average decoding success metric for the plurality of barcode-reading devices by more than a threshold amount.

13. The barcode-reading system of claim 1, wherein:
the data received from a barcode-reading device comprises barcode-reading device settings; and
the instructions on the remote server are also executable by the at least one processor to:
compare the barcode-reading device settings with a set of standard barcode-reading device settings; and
determine, based at least in part on the comparison, that the barcode-reading device is configured differently from other barcode-reading devices.

14. The barcode-reading system of claim 13, wherein performing the at least one action to address the decoding problem comprises sending one or more commands to the barcode-reading device that cause the barcode-reading device settings to be changed.

15. The barcode-reading system of claim 1, wherein:
the data received from a barcode-reading device comprises barcode-reading device settings and captured images; and
the instructions on the remote server are also executable by the at least one processor to:
compare the barcode-reading device settings with a set of standard barcode-reading device settings;
determine, based at least in part on the comparison, that the barcode-reading device is configured similarly to other barcode-reading devices;
provide the captured images to a damaged optics machine learning model;
determine, based on processing results obtained from the damaged optics machine learning model, that the captured images include a characteristic that is indicative of a damaged optical component; and
send a notification message to at least one user device, the notification message comprising an indication that the barcode-reading device could comprise a damaged optical component.

16. The barcode-reading system of claim 1, wherein:
the data received from a barcode-reading device comprises captured images;
the instructions on the remote server are also executable by the at least one processor to provide the captured images to a damaged barcode machine learning model and determine, based on processing results obtained from the damaged barcode machine learning model, that a percentage of the captured images that include an image of a damaged barcode exceeds a threshold value; and
performing the at least one action to address the decoding problem comprises sending a notification message to at least one user device, the notification message comprising an indication that a feature of the barcode-reading system could be damaging the barcodes.

17. The barcode-reading system of claim 1, wherein:
the data comprises captured images and decoding metadata;
the instructions on the remote server are also executable by the at least one processor to:
provide the captured images to a low contrast machine learning model;
determine, based at least in part on processing results obtained from the low contrast machine learning model, that a percentage of the captured images that include a low contrast barcode image exceeds a threshold value; and
use the decoding metadata to determine a most likely cause of the decoding problem from among a plurality of possible causes for low contrast barcode images.

18. The barcode-reading system of claim 17, wherein:
the instructions on the remote server are also executable by the at least one processor to:
determine, based at least in part on the decoding metadata, that a camera shutter speed being utilized by most of the plurality of barcode-reading devices is within a normal range; and
infer, based at least in part on the determination about the camera shutter speed, that at least one printing device is low on ink; and
performing the at least one action to address the decoding problem comprises sending a notification message to at least one user device, the notification message comprising an indication that at least one printing device is low on ink.

19. The barcode-reading system of claim 17, wherein:
the instructions on the remote server are also executable by the at least one processor to:
determine, based at least in part on the decoding metadata, that a camera shutter speed being utilized by most of the plurality of barcode-reading devices is slower than a normal range for the camera shutter speed; and infer, based at least in part on the determination about the camera shutter speed, that the barcode-reading system has poor lighting; and performing the at least one action to address the decoding problem comprises sending a notification message to at least one user device, the notification message comprising an indication related to the lighting of the barcode-reading system.

20. The barcode-reading system of claim 1, wherein:

determining the possible cause of the decoding problem comprises inferring that a printing device is low on ink;

the instructions on the remote server are also executable by the at least one processor to identify the printing device based at least in part on detecting a printer identifier corresponding to the printing device in at least one low contrast barcode image; and performing the at least one action to address the decoding problem comprises sending a notification message to at least one user device, the notification message comprising an indication that the printing device could be low on ink.

\* \* \* \* \*